United States Patent [19]

Darling

[11] Patent Number: 4,926,246
[45] Date of Patent: May 15, 1990

[54] DITHER PROCESSING CIRCUIT

[75] Inventor: Angela M. Darling, Surrey, England

[73] Assignee: Crosfield Electronics Limited, London, England

[21] Appl. No.: 363,005

[22] Filed: Jun. 8, 1989

[30] Foreign Application Priority Data

Jun. 8, 1988 [GB] United Kingdom ............... 8813487

[51] Int. Cl.$^5$ .................... H04N 9/64; H04N 5/91; H04N 11/04
[52] U.S. Cl. .................................. 358/21 R; 358/13; 358/160
[58] Field of Search .................... 358/21 R, 13, 160

[56] References Cited

U.S. PATENT DOCUMENTS 3,259,690  7/1966  Oshima et al. .
3,975,584  8/1976  Gordon ......................... 358/160
4,196,452  4/1980  Warren et al. .
4,568,966  2/1986  Lippel ........................... 358/13

FOREIGN PATENT DOCUMENTS 0270259  6/1988  European Pat. Off. .
1797412  12/1970  Fed. Rep. of Germany .
1285067  8/1972  United Kingdom .

Primary Examiner—John W. Shepperd
Attorney, Agent, or Firm—Sughrue, Mion, Zinn, Macpeak & Seas

[57] ABSTRACT

Apparatus for processing a first signal representing a color component of a pixel of an image in which the signal defines the value of the color component as one of a first set of values defining a first scale of color component values. The apparatus comprises a first Look-up Table addressed by the color component value for generating a second signal representing a modified color component value chosen from a set of modified color component values defining a second scale coarser than the first scale. An adjustment circuit comprises a memory in which at least two sets of adjustment data are stored, each set being associated with a respective dither threshold representing respective differences, hereinafter referred to an aquantization errors, between the first and second signals when compared on the first scale of color component values, the data of each set defining an adjustment instruction for each possible quantization error, the adjustment instruction being related to the difference between the quantization error and the respective dither threshold. The adjustment circuit means receives the first signal so that the memory is addressed by a signal related to the quantization error and related to the position of the pixel in the image so as to generate an adjustment control signal associated with the quantization error and the dither threshold corresponding to the first signal pixel. A modifying circuit is responsive to the adjustment control signal generated by the adjustment circuit to adjust the second signal to generate a final output signal representing one of the second set of the color component values.

7 Claims, 1 Drawing Sheet

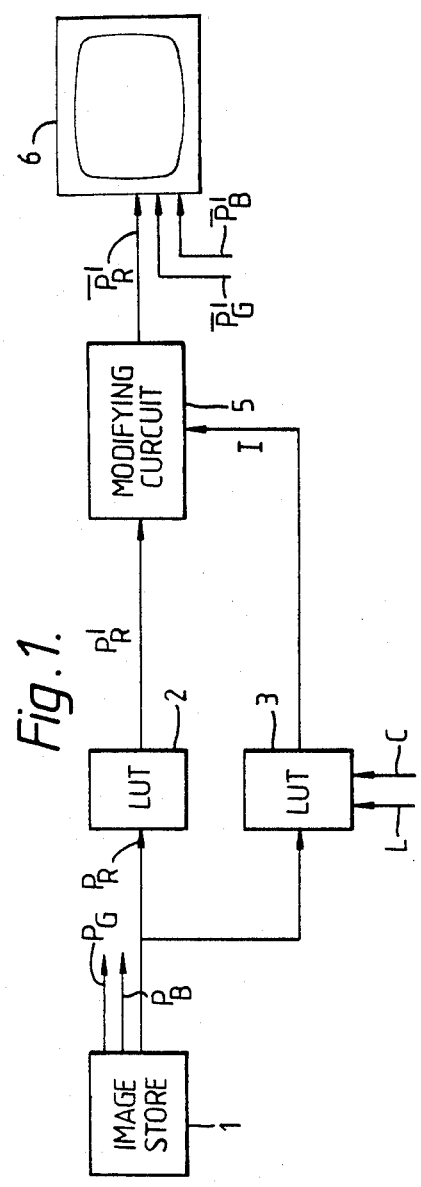
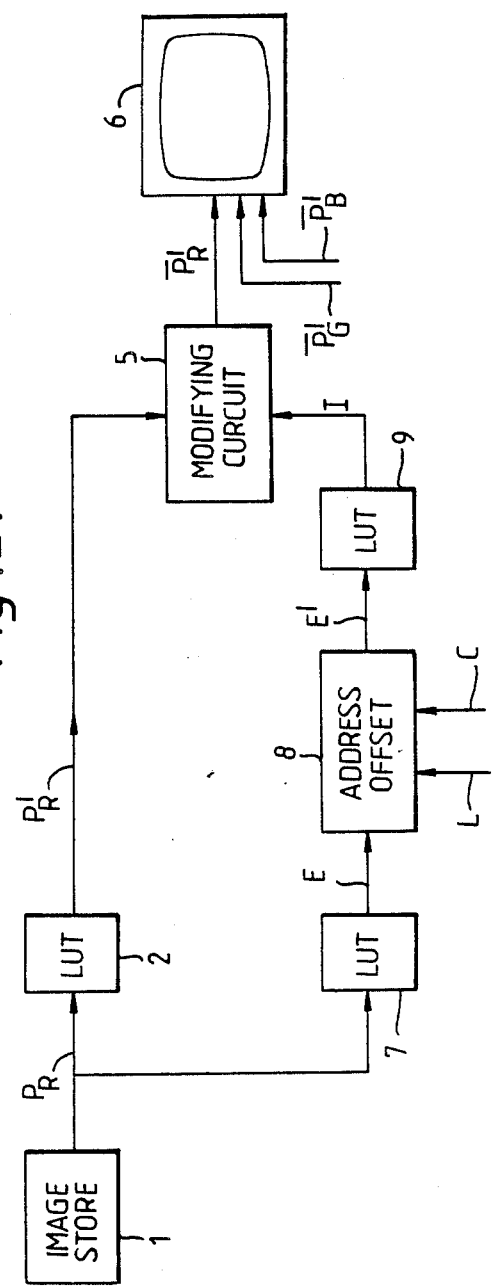

DITHER PROCESSING CIRCUIT

FIELD OF THE INVENTION

The invention relates to apparatus for processing a signal representing a colour component of a pixel of an image, the signal defining the value of the colour component as one of a first set of values defining a first scale of colour component values.

DESCRIPTION OF THE PRIOR ART

Digitised images are commonly quantised to 8 bits per colour component, which is adequate for most applications. Monochrome images will be defined by one value per pixel, while colour images may be defined by three (red, green and blue) or four (cyan, magenta, yellow and black) colour component values. The processing of these values during interactive image modifications such as colour retouching and the like can take a significant amount of time. In order to reduce the time involved, use is made of the property of the human visual system that the grey level resolution of the display device such as a monitor need not necessarily match the grey scale resolution of the image itself. For example, it has been reported that under typical viewing conditions RGB images displayed at 15 bits per pixel and 24 bits per pixel are indistinguishable.

Proposals have been made in the past to quantise pixels for the purposes of display into a second, coarser grey scale. These techniques involve allotting one of the second grey level values to each pixel colour component in accordance with certain algorithms. In a very simple process, each pixel colour component is allotted the second grey level value closest to it. One of the problems with this simple process is that artificial contouring would result and to reduce this, two main methods have previously been proposed. Firstly, an error distribution method has been suggested which involves quantisation of a pixel with propagation of the quantisation error along one or more directions of the picture before the next pixel is quantised. Secondly, dithering which involves initial quantisation of a pixel after which the quantisation error for the pixel is compared with a dither threshold which varies spatially over the image plane. The final output pixel value may be varied depending on whether the error is above or below this threshold.

Error distribution and dithering usually require extra registers to hold the quantisation errors and the dither matrix respectively. This makes such techniques computationally intensive and thus time consuming.

SUMMARY OF THE INVENTION

In accordance with the present invention, apparatus for processing a first signal representing a colour component of a pixel of an image, the signal defining the value of the colour component as one of a first set of values defining a first scale of colour component values comprises a first Look-up Table (LUT) addressed by the colour component value for generating a second signal representing a modified colour component value chosen from a set of modified colour component values defining a second scale coarser than the first scale; adjustment means comprising a memory in which at least two sets of adjustment data are stored, each set being associated with a respective dither threshold representing respective differences, hereinafter referred to as quantisation errors, between the first and second signals when compared on the first scale of colour component values, the data of each set defining an adjustment instruction for each possible quantisation error, the adjustment instruction being related to the difference between the quantisation error and the respective dither threshold, wherein the adjustment means receives the first signal so that the memory is addressed by a signal related to the quantisation error and related to the position of the pixel in the image so as to generate an adjustment control signal associated with the quantisation error and the dither threshold corresponding to the first signal pixel; and modifying means responsive to the adjustment control signal generated by the adjustment means to adjust the second signal to generate a final output signal representing one of the second set of the colour component values.

Preferably, the adjustment means memory comprises one or more look-up tables (LUTs). The LUTs may be constituted by a common hardware component such as a ROM or PROM or could be constituted by separate hardware components, one for each data set.

Conveniently, the apparatus causes each data set in the adjustment means memory to be addressed in a predetermined sequence by successive first signals. In this way, a dither matrix is effectively set up which scrolls across the image. In other words, addressing in relation to the pixel in the image is achieved automatically by addressing the data sets in a predetermined sequence.

The adjustment means memory can be addressed in a variety of ways. In a simple case, the adjustment means memory can be addressed directly by the first signal and by position information to access the correct data set. Preferably, however, the apparatus further comprises error generating means, such as a look-up table, which responds to each first signal to generate an error signal related to the difference between the first signal and the second signal generated by the first look-up table, and means for combining the error signal with pixel position information to generate a modified error signal wherein the adjustment means memory is addressed by the modified error signal.

This apparatus can thus apply dithering through the use of Look-up Tables without the need explicitly to store the dither matrix or to compare quantisation errors and dither thresholds at run time. It therefore allows much quicker, interactive processing to be achieved.

Conveniently, the adjustment instruction signal generated by the adjustment means indicates whether or not the quantisation error is greater than the threshold associated with the corresponding data set, the modifying means being responsive to such a determination to generate a final output signal representing the larger of the second colour components next to that defined by the signal from the first LUT or to generate a final output signl corresponding to that defined by the signal from the first LUT respectively.

Typically, each adjustment instruction will comprise a binary "one" or binary "zero". In addition, an adjustment instruction of −1 is possible if negative errors are allowed.

In an alternative arrangement, the adjustment instruction could indicate whether or not the quantisation error is less than the corresponding threshold, the modifying means generating, in that event, a final output signal representing the smaller of the second colour components next to that defined by the signal from the first LUT or to generate a final output signal corresponding to that defined by the signal from the first LUT respectively.

In some cases, the second set of colour component values could correspond to evenly spaced apart first scale values although in practice, an uneven spacing will usually be adopted.

Typically, the LUTs will be one-dimensional LUTs.

In some cases, a first LUT may be provided for each colour component of the original pixel, each first LUT being associated with respective adjustment means. Preferably, however, a common first LUT is provided for each colour component.

BRIEF DESCRIPTION OF THE DRAWINGS

Two examples of apparatus in accordance with the invention will now be described with reference to the accompanying drawings, in which:

FIG. 1 is a block diagram of a first example of the apparatus; and,

FIG. 2 is a block diagram of a second example of the apparatus.

DETAILED DESCRIPTION OF THE EMBODIMENTS

The apparatus shown in FIG. 1 comprises an image store 1 which stores digitally the colour component values for each pixel of an image. Typically, these colour components will each be defined on a first grey level scale in the range 0-255, thus requiring up to 8 bits to represent them. The colour components in this example comprise red, green and blue and the values are represented by $P_R$, $P_G$, $P_B$ respectively. The values for each pixel are fed as first signals to respective first look-up tables 2 (only one shown) each of which is addressed in turn by the colour component values for successive pixels. The LUTs 2 comprise one-dimensional LUTs with a length (M) equal to the number of grey level values, for example 256. Each location in each LUT is loaded with a colour component value selected from a second grey level scale coarser than the first typically requiring no more than two or three binary digits. The output signals from the LUTs 2 are represented by $P_R'$ for the red component. Similar output signals $P'_B$, $P'_G$ will be generated by corresponding LUTs (not shown) for $P_B$ and $P_G$.

The signals from the image store 1 are also fed to respective LUTs 3 (only one shown) to each of which are also fed line and column values indicating the position of the output pixel.

The LUT 3 shown is addressed by each colour component signal $P_R$, there being, in the FIG. 1 example, four different, selectable values corresponding to each value of the signal $P_R$. These four values represent the relationship between the difference or error E between the input and output values $P_R$, $P_R'$ to and from the LUT 2 respectively and one of four threshold values T(1)-T(4) representing a linear array of four dither thresholds. Each pixel in the image is associated with a respective one of the four dither thresholds and the threshold chosen is selected within the LUT 3 in response to the line and column values fed to the LUT 3.

Consider the simple case where the input signal $P_R$ may take one of twelve values: 0-11 while the output signal $P_4'$ can take one of three values corresponding to 0, 4, and 8 respectively on the first scale. Table 1 below illustrates the content of the LUT 3 in terms of the sets of four data values for each input address value. For clarity, Table 1 also illustrates the corresponding values of $P_R'$ and E. These values, of course, are not stored in the LUT 3.

TABLE 1

| $P_R$ | $P_R'$ | E | T(1) | T(2) | T(3) | T(4) |
|---|---|---|---|---|---|---|
| 0 | 0 | 0 | 0 | 0 | 0 | 0 |
| 1 | 0 | 1 | 1 | 0 | 0 | 0 |
| 2 | 0 | 2 | 1 | 1 | 0 | 0 |
| 3 | 0 | 3 | 1 | 1 | 1 | 0 |
| 4 | 4 | 0 | 0 | 0 | 0 | 0 |
| 5 | 4 | 1 | 1 | 0 | 0 | 0 |
| 6 | 4 | 2 | 1 | 1 | 0 | 0 |
| 7 | 4 | 3 | 1 | 1 | 1 | 0 |
| 8 | 8 | 0 | 0 | 0 | 0 | 0 |
| 9 | 8 | 1 | 1 | 0 | 0 | 0 |
| 10 | 8 | 2 | 1 | 1 | 0 | 0 |
| 11 | 8 | 3 | 1 | 1 | 1 | 0 |

The dither threshold values T(1)-T(4) in this case are 0, 1, 2, and 3 respectively and the data stored represents the relationship between the quantisation error E and the corresponding dither threshold in accordance with the rule:

I(n)=0 if E≦T(n)
I(n)=1 if E>T(n)

The line and column signals effectively select the appropriate threshold column in the above table so that, for example, if the input value $P_R$ is "2" then the output value $P_R'$ will be "0" while the instruction value I will be "1" if the appropriate threshold is T(1) or T(2) and "0" if the threshold value is T(3) or T(4).

The output signals I from the LUT 3 are fed to a modifying circuit 5 together with the signals from the LUT 2. The modifying circuit 5 responds to the incoming signals in the manner to be described below to generate final colour component signals for the original pixel $\overline{P}_R$ which are fed to a monitor 6 along with similar signals $\overline{P}_G$ and $\overline{P}_B$.

The modifying circuit 5 responds to the adjustment instruction signal from the LUT 3 so that if the adjustment instruction signal is binary "0" the output signal from the adjustment circuit 5 will be equal to the input signal i.e. $\overline{P}_R = P_R'$.

If the adjustment instruction signal is a binary 1 then the modifying circuit 5 will cause the output signal $\overline{P}_R$ to be equal to the next higher second grey level scale value.

FIG. 2 illustrates a more complex example of the apparatus. In this case, the apparatus again comprises an image store 1, and a monitor 6 and for each colour component: a first LUT 2, and a modifying circuit 5. However, the manner in which the adjustment instruction signals are generated is slightly different. In this example, each colour component signal is fed in parallel to the respective LUT 2 and to a respective LUT 7. FIG. 2 illustrates the apparatus for the red colour component $P_R$. There will usually be separate LUTs 2, 7, 9 and circuit 8 for each of the other colour components although some sharing is also possible. The LUT 7 is loaded with data constituting the differences between the incoming first signal $P_R$ to the LUT 2 and the corresponding output signal from the LUT 2 when considered on the first scale. An example of the contents of the LUT 7 is given in Table 2 below which illustrates the case of a first scale of values running from 0-15 and a second scale of three values corresponding to 0, 5, and 12 on the first scale. Since the LUT 7 is addressed by the first signal $P_R$ etc, the first column in Table 2 corresponds to each address in the LUT 7. The second column in Table 2 defines the value on the first scale of the signal output by the LUT 2 $P'_R$ etc.

TABLE 2

| $P_R$ | $P_R'$ | E |
|---|---|---|
| 0 | 0 | 0 |
| 1 | 0 | 1 |
| 2 | 0 | 2 |
| 3 | 0 | 3 |
| 4 | 0 | 4 |
| 5 | 5 | 0 |
| 6 | 5 | 1 |
| 7 | 5 | 2 |
| 8 | 5 | 3 |
| 9 | 5 | 4 |
| 10 | 5 | 5 |
| 11 | 5 | 6 |
| 12 | 12 | 0 |
| 13 | 12 | 1 |
| 14 | 12 | 2 |
| 15 | 12 | 3 |

The value E is known as the quantisation error. In this example, all the quantisation errors are positive. It is also possible to handle negative quantisation errors and Table 3 below shows an alternative set of data which may be stored in the LUT 7. (Negative quantisation errors could also be handled in the FIG. 1 example).

TABLE 3

| $P_R$ | $P_R'$ | E |
|---|---|---|
| 0 | 0 | 0 |
| 1 | 0 | 1 |
| 2 | 0 | 2 |
| 3 | 5 | −2 |
| 4 | 5 | −1 |
| 5 | 5 | 0 |
| 6 | 5 | 1 |
| 7 | 5 | 2 |
| 8 | 5 | 3 |
| 9 | 12 | −3 |
| 10 | 12 | −2 |
| 11 | 12 | −1 |
| 12 | 12 | 0 |
| 13 | 12 | 1 |
| 14 | 12 | 2 |
| 15 | 12 | 3 |

It should be noted that in all the examples described, the output signal $P'_R$ from the LUT 2 may represent a value on the first scale, a value on the second scale or some other function related to the second scale value or the first scale value.

The signals E from the LUT 7 are fed to an address offset circuit 8 which generates, in a manner to be described below, an addressing signal E' which is applied to a LUT 9 which fulfils a function similar to the LUT 3, of the FIG. 1 example.

The LUT 9 stores a number of sets of data comprising adjustment instruction data, each set of data being associated with a respective (dither) threshold value (T). For example, consider the case of four data sets where four thresholds are provided T(1)–T(4) defining threshold values 0, 1, 2, 3, respectively. In effect, a selected data set will be addressed by an error signal E and the data at the corresponding address, representing an adjustment instruction I, relates to the difference between the error value E and the appropriate threshold T. Table 4 below illustrates one example of the content I(n) of the LUT 9 for four data sets corresponding to the four thresholds mentioned above.

TABLE 4

| E | T(1) | T(2) | T(3) | T(4) |
|---|---|---|---|---|
| 0 | 0 | 0 | 0 | 0 |
| 1 | 1 | 0 | 0 | 0 |
| 2 | 1 | 1 | 0 | 0 |
| 3 | 1 | 1 | 1 | 0 |

In this case, the rule used to define the content of the data sets is:
I(n)=0 if E≦T(n)
I(n)=1 if E>T(n)

Table 5 below is similar to Table 4 but illustrates the case where quantisation errors can be both positive and negative. In this example, a set of three dither thresholds with values 0, 1, 2 is used while the range of quantisation errors may vary between −2 and 2.

TABLE 5

| E | T(1) | T(2) | T(3) |
|---|---|---|---|
| 0 | 0 | 0 | 0 |
| 1 | 1 | 0 | 0 |
| 2 | 1 | 1 | 0 |
| −1 | −1 | 1 | 0 |
| −2 | −1 | −1 | 0 |

The rule used here is:
I(n)=0 if |E|≦T(n)
I(n)=S×1 if |E|>T(n)
where | | denotes magnitude and S is the sign of E.

In this way, for N thresholds we get N tables or data sets of length M, where M is the number of different values of E. These tables can be combined into one long look-up table of length N×M.

Thus in the cases outlined above in Tables 4 and 5, the format of the LUT 9 could be as shown in Tables 6 and 7 respectively.

TABLE 6

| Address | Output | |
|---|---|---|
| 1 | 0 | T(1) |
| 2 | 1 | |
| 3 | 1 | |
| 4 | 1 | |
| 5 | 0 | T(2) |
| 6 | 0 | |
| 7 | 1 | |
| 8 | 1 | |
| 9 | 0 | T(3) |
| 10 | 0 | |
| 11 | 0 | |
| 12 | 1 | |
| 13 | 0 | T(4) |
| 14 | 0 | |
| 15 | 0 | |
| 16 | 0 | |

TABLE 7

| Address | Output | |
|---|---|---|
| 1 | 0 | T(1) |
| 2 | −1 | |
| 3 | −1 | |
| 4 | 1 | |
| 5 | 1 | |
| 6 | 0 | T(2) |
| 7 | 0 | |
| 8 | −1 | |
| 9 | 0 | |
| 10 | 1 | |
| 11 | 0 | T(3) |
| 12 | 0 | |
| 13 | 0 | |
| 14 | 0 | |

TABLE 7-continued

| Address | Output |
|---------|--------|
| 15 | 0 |

We now consider how each data set within the LUT 9 is addressed.

Associated with the set of thresholds (T) is a spatial pattern (the "dither matrix"). Each point in the pattern is associated with a unique dither threshold T. By moving this pattern across the image, each point in the image is associated with one of these thresholds. For example, suppose that the dither matrix has nine thresholds arranged in a 3×3 format. Then in a 6×6 image, the dither matrix can be positioned at four different positions around the image to generate a correspondence between each pixel and a respective threshold.

In order to cause an error value E to address the correct data set associated with the threshold corresponding to the pixel concerned, it is necessary to generate an offset whichis combined with the incoming error value so as to generate an offset error value E'. This is achieved by the address offset circuit 8 which is controlled by line L and column C information indicating the position of the pixel in relation to the dither matrix. Thus, in the example given in Table 6 above, if an error value corresponds to a pixel associated with the threshold T(2) then the error value itself must be combined with that threshold value to generate the correct address value in the range 5-8.

The adjustment information signal I can take one of two values 0, 1 in the example of Table 6 or one of three values −1, 0, 1 in the example of Table 7. In the first case, the value 0 can be used to cause the modified circuit 5 to pass the incoming signal P' (assuming it is already a signal representative of a second scale value) directly to the monitor 6. Alternatively, if the value I is 1 then the modifying circuit 5 can be controlled to raise the incoming value P' to the next higher quantised value on the second scale. If the value I can take the three values mentioned above, then this can operate as just explained but with the addition that if I has the value −1 then the incoming signal P' is lowered to the next lowered quantised value.

I claim:

1. Apparatus for processing a first signal representing a colour component of a pixel of an image, said signal defining the value of said colour component as one of a first set of values defining a first scale of colour component values, the apparatus comprising a first Look-up Table (LUT) addressed by said colour component value for generating a second signal representing a modified colour component value chosen from a set of modified colour component values defining a second scale coarser than said first scale; adjustment means comprising a memory in which at least two sets of adjustment data are stored, each said set being associated with a respective dither threshold representing respective differences, hereinafter referred to as quantisation errors, between said first and second signals when compared on said first scale of colour component values, the data of each set defining an adjustment instruction for each possible quantisation error, said adjustment instruction being related to the difference between said quantisation error and the respective dither threshold, wherein said adjustment means receives said first signal so that said memory is addressed by a signal related to said quantisation error and related to the position of said pixel in said image so as to generate an adjustment control signal associated with said quantisation error and the dither threshold corresponding to said first signal pixel; and modifying means responsive to said adjustment control signal generated by said adjustment means to adjust said second signal to generate a final output signal representing one of said second set of the colour component values.

2. Apparatus according to claim 1, wherein said adjustment means memory comprises one or more look-up tables.

3. Apparatus according to claim 1, wherein each data set in said adjustment means memory is addressed in a predetermined sequence by successive first signals.

4. Apparatus according to claim 3, wherein said adjustment means memory is addressed directly by said first signal and by position information to access the correct data set.

5. Apparatus according to claim 3, wherein said apparatus further comprises error generating means, which responds to each first signal to generate an error signal related to the difference between said first signal and said second signal generated by said first look-up table, and means for combining said error signal with pixel position information to generate a modified error signal wherein said adjustment means memory is addressed by said modified error signal.

6. Apparatus according to claim 5, wherein said error generating means comprises a look-up table.

7. Apparatus according to claim 1, wherein said adjustment instruction signal generated by said adjustment control means indicates whether or not said quantisation error is greater than the threshold associated with the corresponding data set, said modifying means being responsive to such a determination to generate a final output signal representing the larger of the second colour components next to that defined by the signal from said first LUT or to generate a final output signal corresponding to that defined by the signal from said first LUT respectively.

* * * * *